US012703535B1

(12) United States Patent
Fella et al.

(10) Patent No.: US 12,703,535 B1
(45) Date of Patent: Aug. 11, 2026

(54) STACKABLE PACKAGING

(71) Applicant: Pratt Corrugated Holdings, Inc., Brookhaven, GA (US)

(72) Inventors: Robert J. Fella, Shoemakersville, PA (US); Philip E. Neary, Union Dale, PA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

(21) Appl. No.: 18/542,292

(22) Filed: Dec. 15, 2023

(51) Int. Cl.

| | |
|---|---|
| ***B65D 5/00*** | (2006.01) |
| ***B31B 50/62*** | (2017.01) |
| ***B65D 5/28*** | (2006.01) |
| *B31B 100/00* | (2017.01) |
| *B31B 110/35* | (2017.01) |
| *B31B 120/30* | (2017.01) |
| *B31B 120/40* | (2017.01) |
| *B31B 120/70* | (2017.01) |

(52) U.S. Cl.
CPC ............ *B65D 5/0045* (2013.01); *B31B 50/62* (2017.08); *B65D 5/28* (2013.01); *B31B 2100/00* (2017.08); *B31B 2110/35* (2017.08); *B31B 2120/302* (2017.08); *B31B 2120/40* (2017.08); *B31B 2120/70* (2017.08)

(58) Field of Classification Search
CPC ........ B65D 5/0045; B65D 5/28; B65D 5/003; B65D 5/443; B65D 5/002; B65D 5/20; B65D 5/001; B65D 5/0015; B65D 5/0025; B65D 5/22
USPC ....... 229/171, 918, 191, 174, 169, 143, 915, 229/164, 170, 190, 198, 916, 919; 206/512, 775
See application file for complete search history.

(56) References Cited

U.S. PATENT DOCUMENTS

| | | | |
|---|---|---|---|
| 2,665,836 | A | 1/1954 | Rendall |
| 2,843,305 | A | 7/1958 | Myers |
| 2,843,306 | A | 7/1958 | Myers et al. |
| 4,056,223 | A | 11/1977 | Williams |
| D258,269 | S | 2/1981 | Boykin et al. |
| 4,418,863 | A | 12/1983 | Kimbrell, Sr. |

(Continued)

FOREIGN PATENT DOCUMENTS

| | | |
|---|---|---|
| EP | 0538098 | 4/1993 |
| FR | 2639616 | 6/1990 |

(Continued)

OTHER PUBLICATIONS

Fella, Robert J.; Non-Final Office Action for Design U.S. Appl. No. 29/923,156, filed Dec. 28, 2023, mailed Jun. 17, 2025, 15 pgs.

(Continued)

*Primary Examiner* — Christopher R Demeree
(74) *Attorney, Agent, or Firm* — Smith, Gambrell & Russell, LLP

(57) ABSTRACT

A packing element includes a base, a plurality of side walls connected to the base, at least one support formation connected to one side wall, each support formation including a first support panel connecting to the side wall, a second support panel connected to the first support panel, and, a connection support panel connected to the second support panel, at least one top tab connected one side wall, each top tab including a central portion and at least one side portion.

19 Claims, 14 Drawing Sheets

(56) References Cited

U.S. PATENT DOCUMENTS

| | | | | |
|---|---|---|---|---|
| 4,613,045 | A | 9/1986 | Watson | |
| 5,289,970 | A * | 3/1994 | McClure | B65D 5/6632 229/149 |
| 5,649,663 | A * | 7/1997 | Pestow, Jr. | B65D 5/0045 229/174 |
| 5,971,906 | A * | 10/1999 | Tharpe, Jr. | B65D 71/0096 493/131 |
| 6,158,653 | A | 12/2000 | Kanter et al. | |
| D441,644 | S | 5/2001 | Pero et al. | |
| 6,325,282 | B1 | 12/2001 | Kanter et al. | |
| 6,488,201 | B1 | 12/2002 | Van Eijndhoven et al. | |
| 6,817,514 | B2 | 11/2004 | Kanter et al. | |
| 6,886,738 | B2 | 5/2005 | Teixidor Casanovas | |
| 7,246,737 | B2 | 7/2007 | Teixidor Casanovas | |
| 8,622,282 | B2 | 1/2014 | Brundage et al. | |
| 8,800,850 | B2 * | 8/2014 | Macleod | B65D 5/003 229/109 |
| 9,045,251 | B2 * | 6/2015 | Sanchez | B65D 5/443 |
| D825,329 | S | 8/2018 | Ross | |
| D833,862 | S | 11/2018 | Nelson et al. | |
| 10,457,439 | B2 | 10/2019 | Buscema | |
| 10,640,286 | B1 | 5/2020 | Lycourt et al. | |
| 10,894,628 | B2 | 1/2021 | Buscema | |
| D970,223 | S | 11/2022 | Huang | |
| 2007/0090172 | A1 * | 4/2007 | Lyon | B65D 5/563 229/5.84 |
| 2014/0312110 | A1 | 10/2014 | De Beer | |
| 2021/0101715 | A1 | 4/2021 | Buscema | |
| 2023/0015782 | A1 | 1/2023 | Fischhuber | |
| 2023/0202705 | A1 | 6/2023 | Querol Puig | |

FOREIGN PATENT DOCUMENTS

| | | |
|---|---|---|
| FR | 2992300 | 12/2013 |
| KR | 200482247 | 1/2017 |

OTHER PUBLICATIONS

Fresh Oyster Mushrooms—Wonshan Mushrooms. Date first available: 2025. Site visited: May 6, 2025. Available online: https://wonshanmushrooms.com/products/5lbs-fresh-oyster-mushrooms (Year: 2025).

Wholesale Mushroom Boxes | Custom Printed Mushroom Packaging Boxes. Date first available: Feb. 13, 2025. Site visited: May 6, 2025. Available online: https://www.emenacpackaging.com/product-description/mushroom-boxes/ (Year: 2025).

Mrowczynski, et al.; Article entitled: "Sensitivity Analysis of Open-Top Cartons in Terms of Compressive Strength Capacity", located at <https://www.mdpi.com/journal/materials>, Materials 2023, 16, 412, Published Jan. 1, 2023, 14 pgs.

Pratt Industries; Photo of "Lightning Oyster Tray", publicly available prior to Dec. 15, 2022, 1 pg.

Fella, Robert J.; Ex Parte Quayle Action for Design U.S. Appl. No. 29/923,156, filed Dec. 28, 2023, mailed Oct. 1, 2025, 12 pgs.

Fella, Robert J.; Applicant Initiated Interview Summary for U.S. Appl. No. 29/923,156, filed Dec. 28, 2023, mailed Jun. 3, 2026, 3 pgs.

* cited by examiner

STACKABLE PACKAGING

TECHNICAL FIELD

This disclosure relates to packaging. More specifically, this disclosure relates to stackable packaging.

BACKGROUND

Various packaging elements can be utilized to hold produce or other bulk items. However, for stability, packaging can become bulky, and elements used to improve stability can impede access to the contents of the packaging. Additionally, when forming packaging from a blank, material usage can become out of control in efforts to improve stability in stacking.

SUMMARY

In one aspect of the current disclosure, a blank for forming packaging can include a base; a plurality of side walls connected to the base, each side wall connected to the base by a line; at least one support formation connected to one side wall by a line, each support formation can include a first support panel connecting to the side wall by a line; a second support panel connected to the first support panel by a line; and, a connection support panel connected to the second support panel by a line; and at least one top tab connected one side wall by a line, each top tab comprising a central portion; and, at least one side portion, each side portion connected to the central portion by a line; wherein each side portion defines a horizontal edge, a vertical edge, and a joining edge, the joining edge defined joining the horizontal edge to the vertical edge.

In another aspect of the current disclosure, a packaging element can be formed from a blank, the packaging element can include a base; a first side wall connected to the base; a second side wall opposite the first side wall, the second side wall connected to the base; a third side wall adjacent to each of the first side wall and the second side wall, the third side wall connected to the base; a fourth side wall opposite the first side wall and adjacent to the first side wall and the second side wall, the fourth side wall connected to the base; a support formation connected to the third side wall, the support formation can include a first support panel connecting to and arranged orthogonally to the third side wall, the first support panel contacting the first side wall; a second support panel connected to and arranged at an acute angle to the first support panel; and, a connection support panel connected to the second support panel and arranged coplanar to and contacting the third side wall, the connection support panel adhered to the third side wall, wherein the support formation defines an end; and a top tab connected to one side wall, the one side wall being one of the first side wall, the second side wall, the third side wall, and the fourth side wall, the top tab can include a central portion arranged orthogonally to the one side wall; and, at least one side portion, each side portion connected to and arranged orthogonally to the central portion; wherein each side portion can be adhered in coplanar facing contact to one other side wall, the one other side wall being one of the first side wall, the second side wall, the third side wall, and the fourth side wall, the one other side wall being different from the one side wall.

In another aspect of the current disclosure, a method of forming a packaging element from a blank can include the steps of: obtaining a blank, the blank including: a base; a plurality of side walls connected to the base, each side wall connected to the base by a line; at least one support formation connected to one side wall by a line, each support formation including a first support panel connecting to the side wall by a line; a second support panel connected to the first support panel by a line; and, a connection support panel connected to the second support panel by a line; and at least one top tab connected one side wall by a line, each top tab including a central portion; and, at least one side portion, each side portion connected to the central portion by a line; wherein each side portion defines a horizontal edge, a vertical edge, and a joining edge, the joining edge defined joining the horizontal edge to the vertical edge, wherein each side portion defines a width, wherein each side defines a height; arranging each support formation in completed arrangement comprising the steps of arranging the first support panel orthogonal to the one side wall to which the support formation connects; arranging the second support panel in acute angle arrangement with respect to the first support panel; and, arranging the connection support panel in facing coplanar contact with the one side wall to which the support formation connects; adhering the connection support panel to the one side wall to which the connection support panel connects; arranging each side wall orthogonally to the base such that each first support panel contacts one other side wall, the one other side wall being different from the one side wall to which the support formation connects; arranging each top tab orthogonally to the one side wall to which each top tab connects; arranging each side portion orthogonally to one central portion and in facing coplanar contact with one other side wall; adhering each side portion to the one other side wall.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is stackable packaging and associated methods, systems, devices, and various apparatus. The stackable packaging includes features designed for reinforcement of load bearing elements. It would be understood by one of skill in the art that the disclosed packaging is described in but a few exemplary embodiments among many. No particular terminology or description should be considered limiting on the disclosure or the scope of any claims issuing therefrom.

Figure 1:
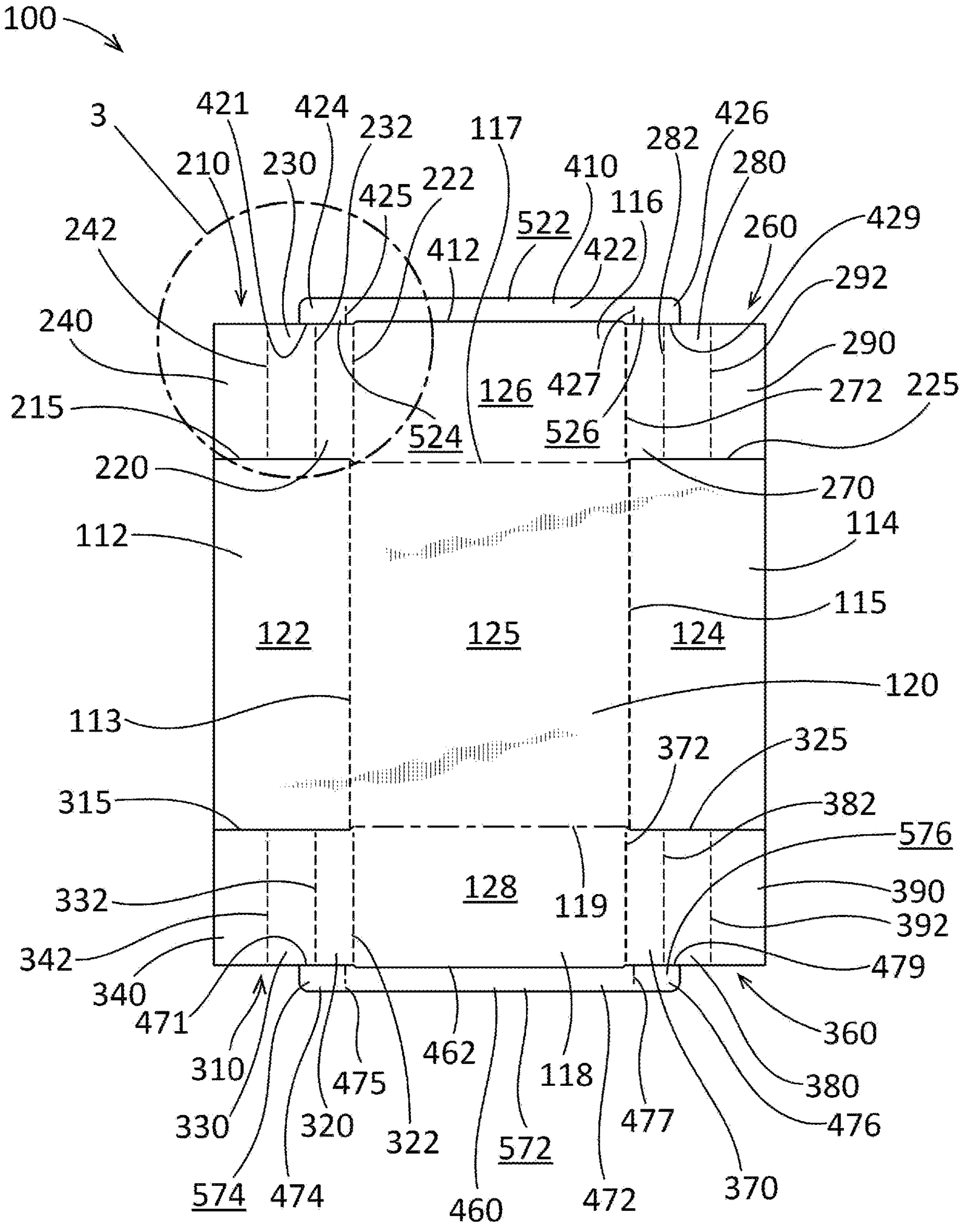
FIG. 1 is a plan view of a blank for producing a packaging element in accordance with one aspect of the current disclosure.

One embodiment of stackable packaging is disclosed and described with reference FIG. 1. A blank 100 can be used to form stackable packaging in various aspects of the current disclosure. In the current aspect, the blank 100 can be formed of various paper product, including paperboard, corrugated cardboard, kraft paper, and various other materials. In various aspects, the blank 100 can be formed of varying materials including various plastics, metals, wood, or various other elements. In various aspects, the blank 100 can be a combination of materials described herein or known within the relevant art. In various aspects, the packaging of the current disclosure can be formed without the use of a blank such as the blank 100. One of skill in the art would understand that blank 100 is but one method of assembling the packaging of the current disclosure.

The blank 100 can comprise a plurality of side walls 112, 114, 116, 118 connected to a base 120. Side wall 112 can be connected to base 120 by line 113; side wall 114 can be connected to base 120 by line 115; side wall 116 can be connected to base 120 by line 117; side wall 118 can be connected to base 120 by line 119. In various aspects, each connection can be by a variety of arrangements.

In various aspects, the current disclosure references "lines" such as lines 113,115,117,119. In various aspects, "lines" refer to perforations, cuts, creases, or combinations of cuts, perforations, and creases. In various aspects, perforations can be ⅜ inches; in various aspects, perforations can be ¼ inches; in various aspects, cuts can be ½ inches; in various aspects, perforations and cuts can be of variant sizes. If not specified in the disclosure, one of skill in the art would understand that various lines described herein can be interchangeable between various aspects of the current disclosure, and one of skill in the art would not understand any particular embodiment of "lines" to be limiting on the scope of the disclosure.

In various aspects, lines 113,115,117,119 can be creases; in various aspects, lines 113,115,117,119 can be perforations; in various aspects, lines 113,115,117,119 can be cuts and creases; in various aspects, lines 113,115,117,119 can be combinations of cuts, perforations, and creases. In various aspects, perforations can be ⅜ inches; in various aspects, perforations can be ¼ inches; in various aspects, cuts can be ½ inches; in various aspects, perforations and cuts can be of variant sizes. In the current aspect, lines 113,115 can be ¼ inch perforations while lines 117,119 can be creases. Side walls 112,114,116,118 can define inner surfaces 122,124, 126,128, respectively. Base 120 can define inner surface 125.

Side wall 116 can be connected to a support formation 210. Side wall 116 can be connected to a support formation 260. In the current aspect, support formation 210 can comprise a first support panel 220, a second support panel 230, and a connection support panel 240. In the current aspect, support formation 260 can comprise a first support panel 270, a second support panel 280, and a connection support panel 290. Each first support panel 220,270 can be connected to the side wall 116 by a line 222,272, respectively. Second support panels 230,280 can be connected to first support panels 220,270 by lines 232,282, respectively. Connection support panels 240,290 can be connected to second support panels 230,280 by lines 242,292, respectively. A cut line 215 can separate side wall 112 from support formation 210. A cut line 225 can separate side wall 114 from support formation 260.

Side wall 118 can be connected to a support formation 310. Side wall 116 can be connected to a support formation 360. In the current aspect, support formation 310 can comprise a first support panel 320, a second support panel 330, and a connection support panel 340. In the current aspect, support formation 360 can comprise a first support panel 370, a second support panel 380, and a connection support panel 390. Each first support panel 320,370 can be connected to the side wall 118 by a line 322,372, respectively. Second support panels 330,380 can be connected to first support panels 320,370 by lines 332,382, respectively. Connection support panels 340,390 can be connected to second support panels 330,380 by lines 342,392, respectively. A cut line 315 can separate side wall 112 from support formation 310. A cut line 325 can separate side wall 114 from support formation 360.

A top tab 410 can be connected to side wall 116 by line 412. A top tab 460 can be connected to side wall 118 by line 462. The top tab 410 can comprise a central portion 422 and a pair of side portions 424, 426. Side portions 424,426 can be connected to central portion 422 by lines 425,427, respectively. The central portion 422 can define an inner surface 522. Side portions 424,426 can define inner surfaces 524,526, respectively. Top tab 460 can comprise a central portion 472 and a pair of side portions 474, 476. Side portions 474,476 can be connected to central portion 472 by lines 475,477, respectively. The central portion 472 can define an inner surface 572. Side portions 474,476 can define inner surfaces 574,576, respectively. A line 421 can separate side portion 424 from support formation 210. A line 429 can separate side portion 426 from support formation 260. A line 471 can separate side portion 474 from support formation 310. A line 479 can separate side portion 476 from support formation 360. In the current aspect, lines 421, 424, 471, and 474 can be cut lines.

Figure 2:
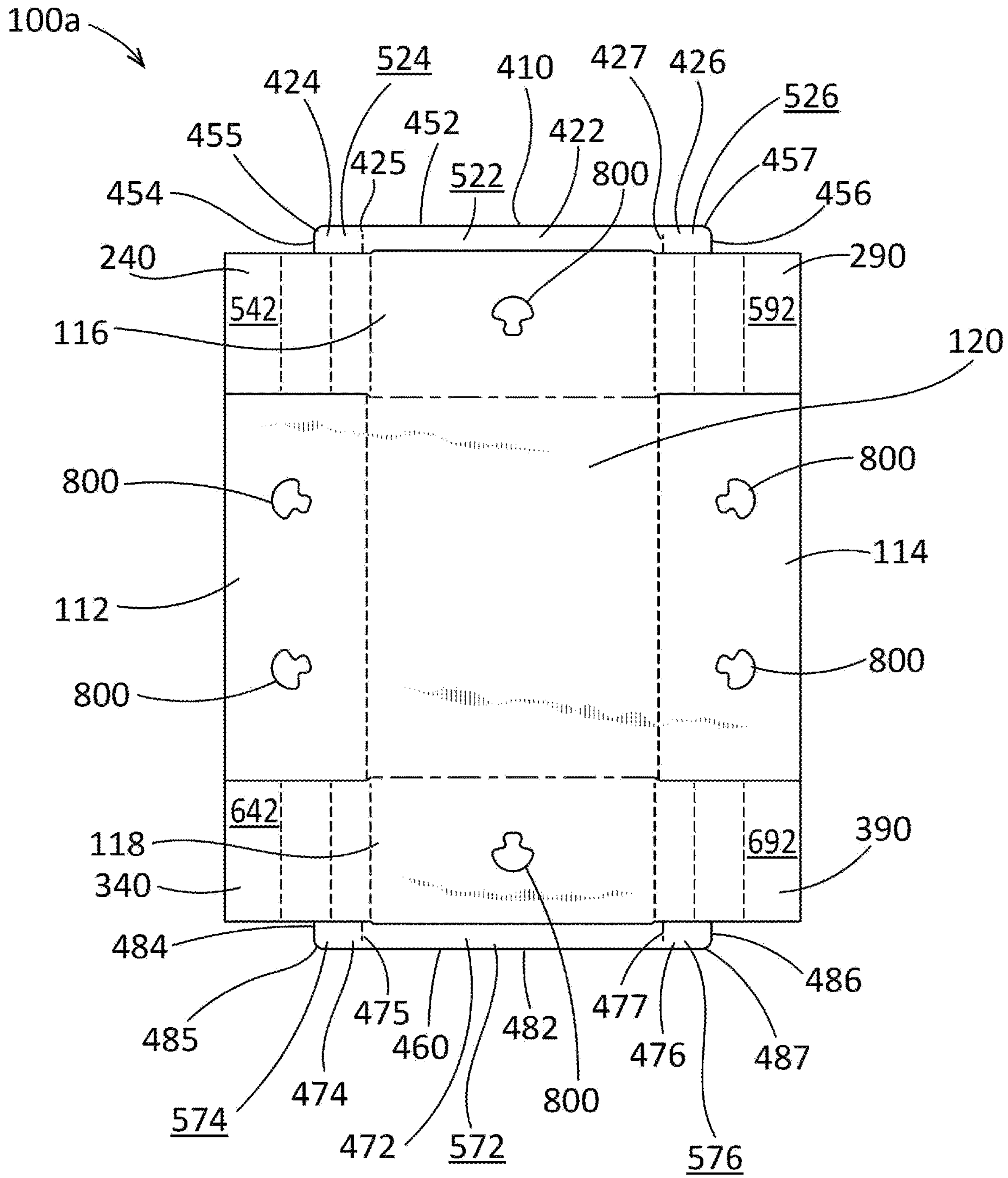
FIG. 2 is a plan view of a blank which is an alternate design of the blank of FIG. 1 in accordance with one aspect of the current disclosure.

With reference to FIG. 2, blank 100*a* can be seen. Blank 100*a* is similar to blank 100 but can include a plurality of holes 800, as will be discussed in additional detail below. Additional details common to blanks 100,100*a* can be seen with reference to FIG. 2 as well.

Top tab 410 can define a lateral edge 452 spanning the extent of the central portion 422 and the side portions 424,426. Each side of the top tab 410 can define a vertical edge 454,456, respectively. At the junction of lateral edge 452 and vertical edge 454, a joining edge 455 can be defined in various aspects. At the junction of lateral edge 452, and vertical edge 456, a joining edge 457 can be defined in various aspects. In various aspects, joining edges 455,457 can various shapes and sizes. In the current aspect, joining edges 455,457 are fillets; in various aspects, joining edges 455,457 can be shoulders, zig zags, various curvature shapes, and various other defined shape edges.

Top tab 460 can define a lateral edge 482 spanning the extent of the central portion 472 and the side portions 474,476. Each side of the top tab 460 can define a vertical edge 484,486, respectively. At the junction of lateral edge 482 and vertical edge 484, a joining edge 485 can be defined in various aspects. At the junction of lateral edge 482, and vertical edge 486, a joining edge 487 can be defined in various aspects. In various aspects, joining edges 485,487 can various shapes and sizes. In the current aspect, joining edges 485,487 are fillets; in various aspects, joining edges 485,487 can be shoulders, zig zags, various curvature shapes, and various other defined shape edges.

Connection support panel 240,290,340,390 can define inner surfaces 542,592,642,692, respectively.

Holes 800 can be defined within each side wall 112,114, 116,118 of the blank 100*a*. In various aspects, the holes 800 can be of various shapes and arrangements in the blank 100*a*. In the current aspect, two holes 800 can be defined in each side wall 112,114. In the current aspect, one hole 800 can be defined in each side wall 116,118. In various aspects, various numbers of holes can be included in various locations. In various aspects, various shapes of holes 800 can be included. In the current aspect, holes 800 are arranged in the shape of a mushroom with intention that the packaging created from the blank 100*a* would be designed to contain mushrooms. In various aspects, various leaves, tubers, legumes, or fruit shapes can be used as the outline shape of the defined holes 800. In various aspects, the holes 800 can be circular, ovular, rectangular, square, trapezoidal, or various other shapes. In various aspects, holes 800 can be included for air flow and/or venting purposes. In various aspects, holes 800 can be included for the purpose of grasping the resultant packaging, such as for handles. In various aspects, holes 800 can be defined such that material is cut completely from within each hole 800. In various aspects, holes 800 can be defined with elements remaining connected to the packaging.

Figure 3:
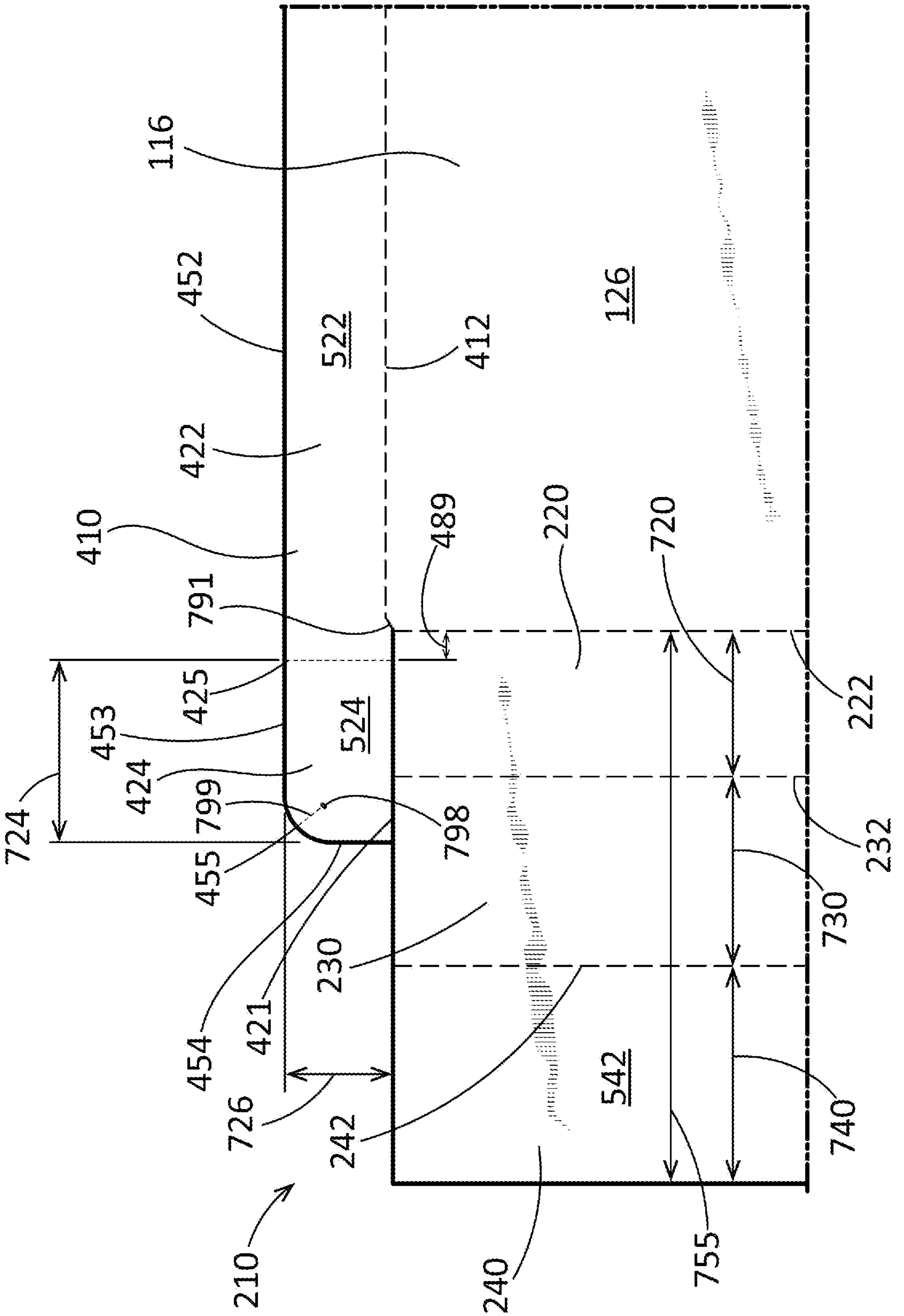
FIG. 3 is a detail view of the blank of FIG. 1 annotated by the area indicated by detail 3 of FIG. 1.

The view of FIG. 3 shows a close-up detail of one corner of the blank 100 or blank 100*a*. However, in the current aspect, all of the corners of the blank 100 or blank 100*a* can be substantially the same—or can be arranged in reverse—in their features, proportions, elements, and functions. In various aspects, varying arrangements can be utilized to alter functionality. As the corner view of FIG. 3 can be substantially the same or mirror image for all of the other corner functions in the current aspect, one of skill in the art would understand that a description of specific characteristics of elements shown in FIG. 3 can be extended to be applicable to the other corners of the blank 100 or blank 100*a*. As such, dimensions and proportions discussed can be assumed by one of skill in the art to be substantially similar to other dimensions and proportions in the current aspect, although one of skill in the art would also understand that varying dimensions and proportions are considered within the scope of the current disclosure.

As can be seen by reference to FIG. 3, side portion 424 can extend in space from line 425 to vertical edge 454. Line 425 can be arranged offset from line 222 by an overhang distance 489. In various aspects, the overhang distance 489 can be various measurements. In the current aspect, the overhang distance 489 can be arranged such that the offset allows line 425 to overlap at an edge of the resultant packaging and accommodate the thicknesses of various elements to be arranged under side portion 424. A horizontal edge 453 can be seen as well. The horizontal edge 453 can be a portion of the lateral edge 452 in the region of the side portion 424.

Additionally, it can be seen that side portion 424 can be separated from support formation 210 by line 421. In the current aspect, line 421 can be a cut line, as previously described. Line 421 can be defined along all of side portion 424 and along a small amount of central portion 422. In the current aspect, the overhang distance 489 can define the length by which line 421 can extend into central portion 422. Additionally, inner surface 542 can be seen as can be defined by connection support panel 240.

The first support panel 220 can be of a width 720. The second support panel 230 can be of a width 730. The connection support panel 240 can be of a width 740. In various aspects, the widths 720,730,740 can be of various measurements. In the current aspect, the width 720 can be smaller than the width 730. In the current aspect, the width 730 can be smaller than the width 740. In the current aspect, the width 720 can be about 1.5 inches. In the current aspect, the width 730 can be about two inches. In the current aspect, the width 740 can be about 2.25 inches. The side portion 424 can be of a width 724 and a height 726. In the current aspect, the width 724 can be about the same as width 730. In the current aspect, the width 724 can be about two inches. In the current aspect, the height 726 can about 1.125 inches. In the current aspect, the joining edge 455 can be a radius having a vertex 798 with a radial dimension 799 as measured between the joining edge 455 and the vertex 798. In the current aspect, the radial dimension 799 can be about one third of the height 726. An indent 791 can be seen in the central portion 422. The indent 791 in the current aspect can begin at the end of the line 421. The indent 791 can be a chamfer providing a slight return between line 421 and line 412. In various aspects, the indent 791 can be omitted.

A composite distance 755 of distances 720,730,740 can be seen. The composite distance 755 can be the same as a height dimension of the side wall 112. The composite distance 755 can represent an overall height of packaging resulting from the blank 100,100*a* in the current aspect. In the current aspect, the composite distance 755 can be about 5.75 inches. Comparing the width 724 with the composite distance 755, the width 724 can be about 34.7% of the composite distance 755. In various aspects, the width 724 can be less than 35% of the composite distance 755. In various aspects, the width 724 can be about one third of the composite distance 755.

Figure 4:
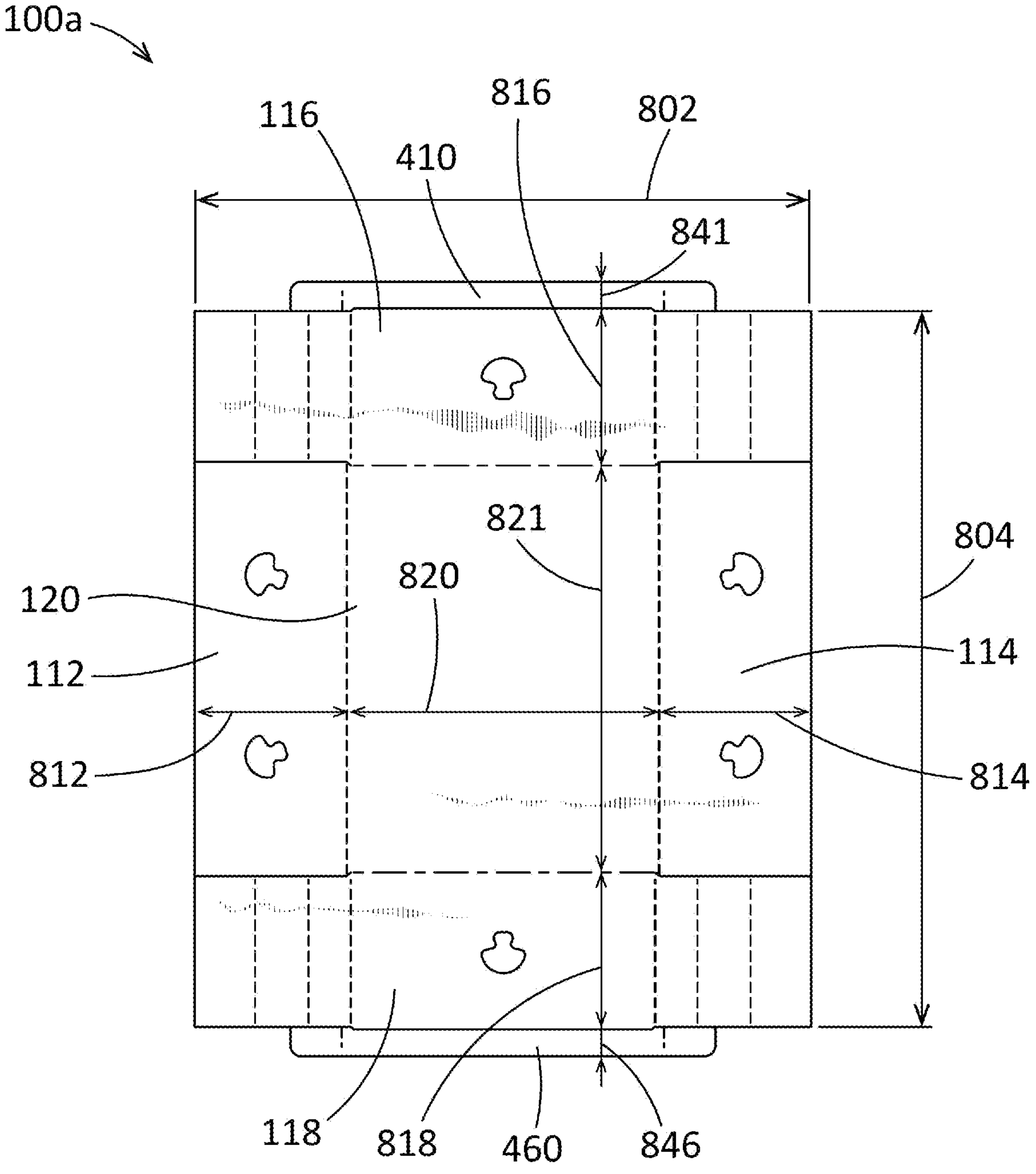
FIG. 4 is a plan view of the blank of FIG. 2.

Seen with reference to FIG. 4, an overall width 802 and an overall height 804 of the blank 100*a* can be defined. A width 820 and height 821 of the base 120 can be defined. A width 812 of the side wall 112 can be defined, and a width 814 of the side wall 114 can be defined. In the current aspect, the width can be about the same as the width 812. A height 816 of the side wall 116 can be defined, and a height 818 of the side wall 118 can be defined. In the current aspect, the height 816 can be about the same the height 818. In the current aspect, a width of each side wall 116,118 is about the same as the width 820, and a height of each side wall 112,114 is about the same the height 821. In various aspects, various other arrangements can be made without departing from the scope of the disclosure.

A height 841 of the top tab 410 can be defined as substantially similar to the height 726 (seen with reference to FIG. 3). A height 846 of the top tab 460 can be defined as substantially similar to the height 841.

In the current aspect, the width 802 can be about 23.25 inches. In the current aspect, the height 804 can be about 29.125 inches. In the current aspect, the width 812 and the width 814 can each be about 5.75 inches. In the current aspect, the height 816 and the height 818 can each be about 5.875 inches. In the current aspect, the width 820 can be about 11.75 inches. In the current aspect, the height 821 can be about 15.25 inches. In the current aspect, the height 841 and the height 846 can each be about 1.0625 inches. Although specific dimensions are cited herein, one of skill in the art would understand that specific dimensions cited would not be limiting on the scope of the disclosure and are produced for the purpose of enabling one of skill in the art to make and use but one aspect of the current disclosure.

Figure 5:
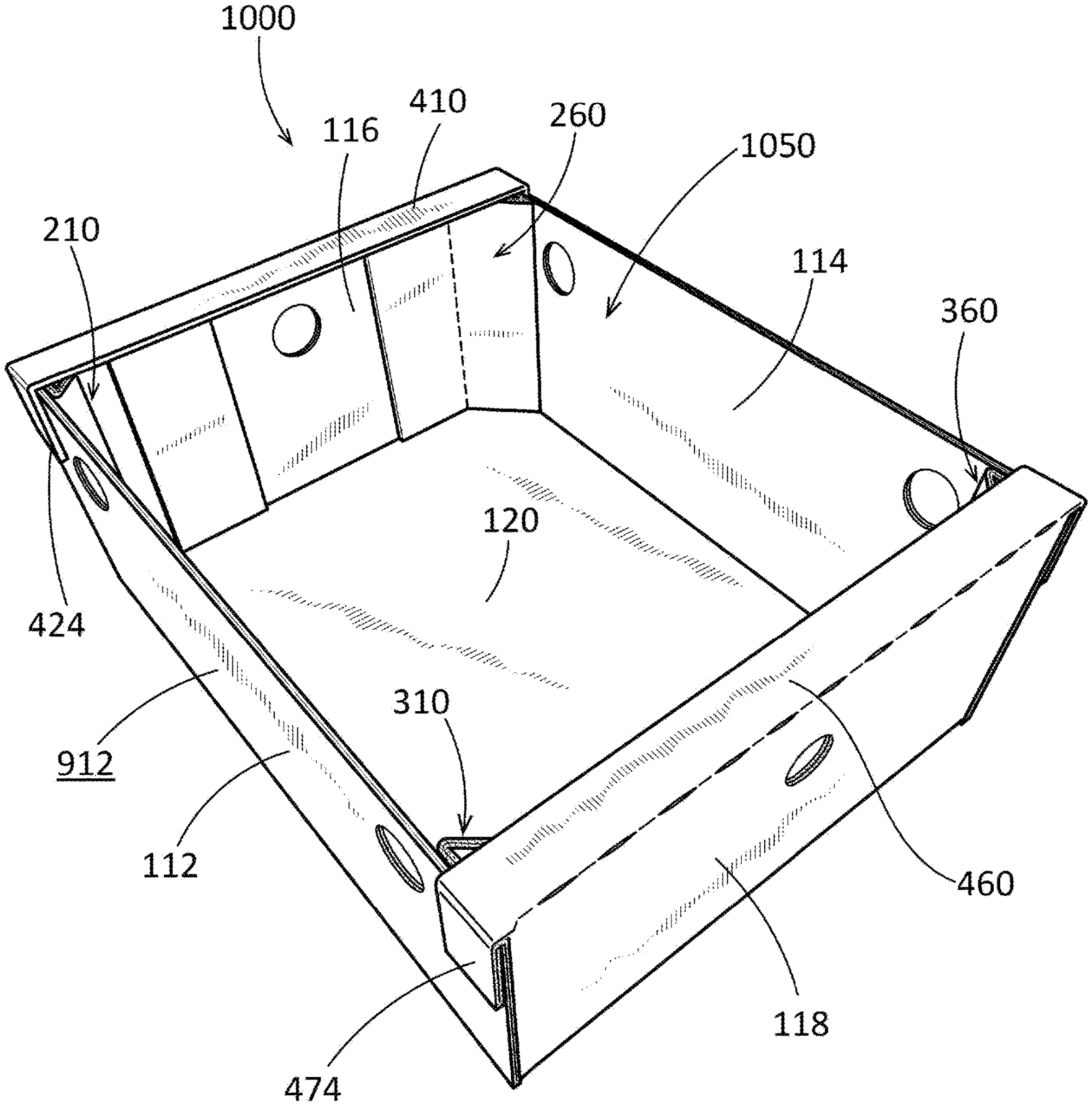
FIG. 5 is a perspective view of a packaging element formed from the blank of FIG. 1 in accordance with one aspect of the current disclosure.

As seen with reference to FIG. 5, packaging 1000 can be formed from blank 100. Support formations 210,260,310,360 can be seen in fully assembled arrangement. An outer surface 912 of the side wall 112 can be seen. An opening 1050 can be seen defined between top tab 410 and top tab 460.

With reference to FIG. 6-10, assembly of support formation 210 can be seen. One of skill in the art would understand that the assembly of support formation 210 can be substantially similar to the assembly of support formations 260, 310,360 a well.

Figure 6:
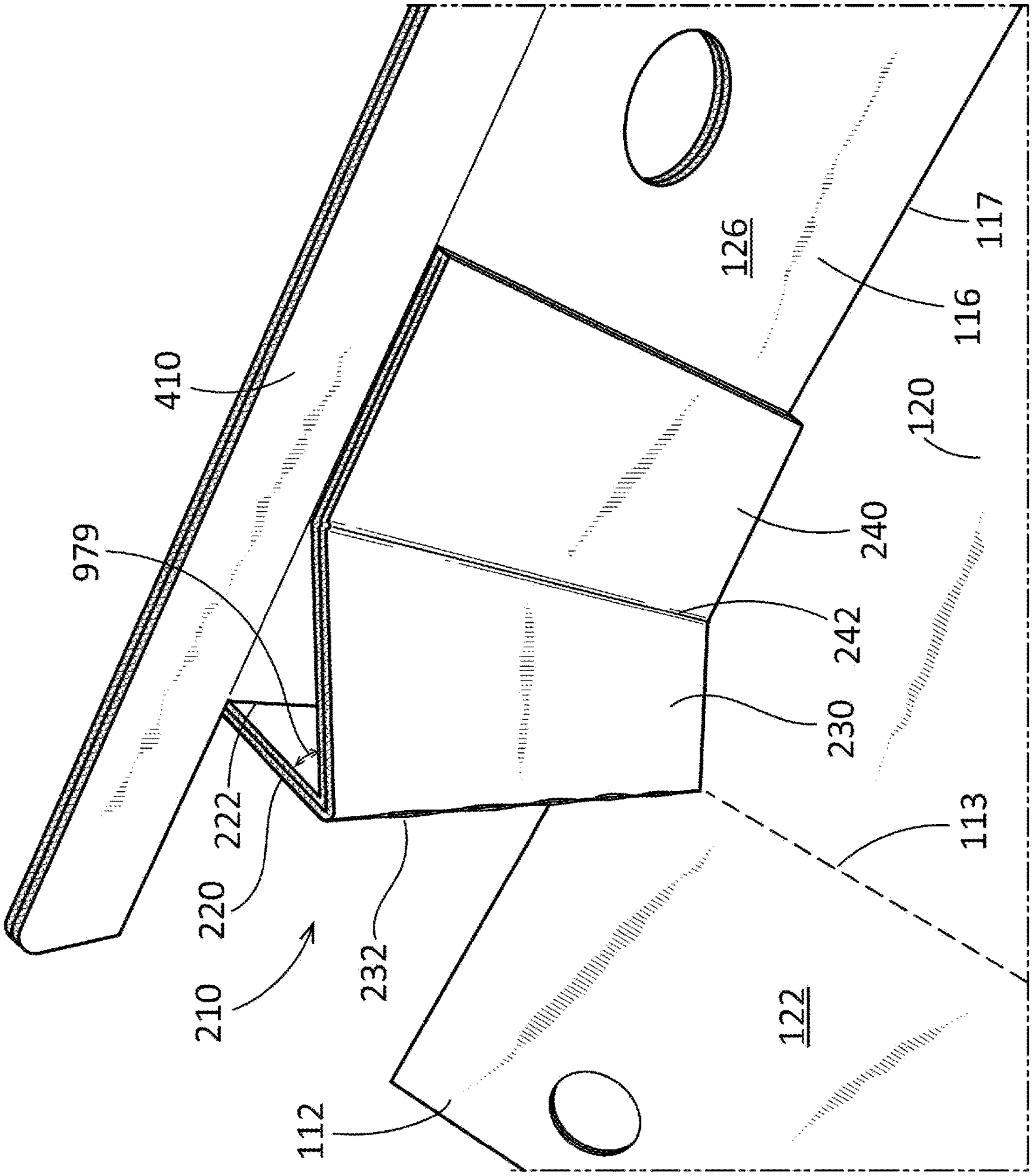
FIG. 6 is a detail perspective view of a support formation of the blank of FIG. 1 in process of assembly into the packaging element of FIG. 5.

With specific reference to FIG. 6, the support formation 210 can be seen process of assembly or formation from the blank 100. Side wall 116 can be bent along line 117 such that side wall 116 can be arranged orthogonal to base 120. The support formation 210 can be bent along line 222 such that first support panel 220 can be arranged about orthogonal to side wall 116. Second support panel 230 can be bent with respect to first support panel 220 along line 232 such that second support panel 230 and first support panel 220 can form an acute angle 979. Connection support panel 240 can be arranged such that inner surface 542 can be in facing contact with inner surface 126. In various aspects, the inner surface 542 of the connection support panel 240 can be arranged to be coplanar with inner surface 126. In various aspects, inner surface 542 of connection support panel 240 can be adhered to inner surface 126 of side wall 116 such that the support formation 210 can obtain a structural connection to side wall 116. In the current aspect, inner surface 542 can be adhered to inner surface 126 using glue. In various aspects, inner surface 542 can be adhered to inner surface 126 using glues, tapes, mechanical fasteners, key-fit arrangements defined in the various surfaces, and chemical adhesion among various other forms of connection depending on the material used to form the packaging 1000.

Figure 7:
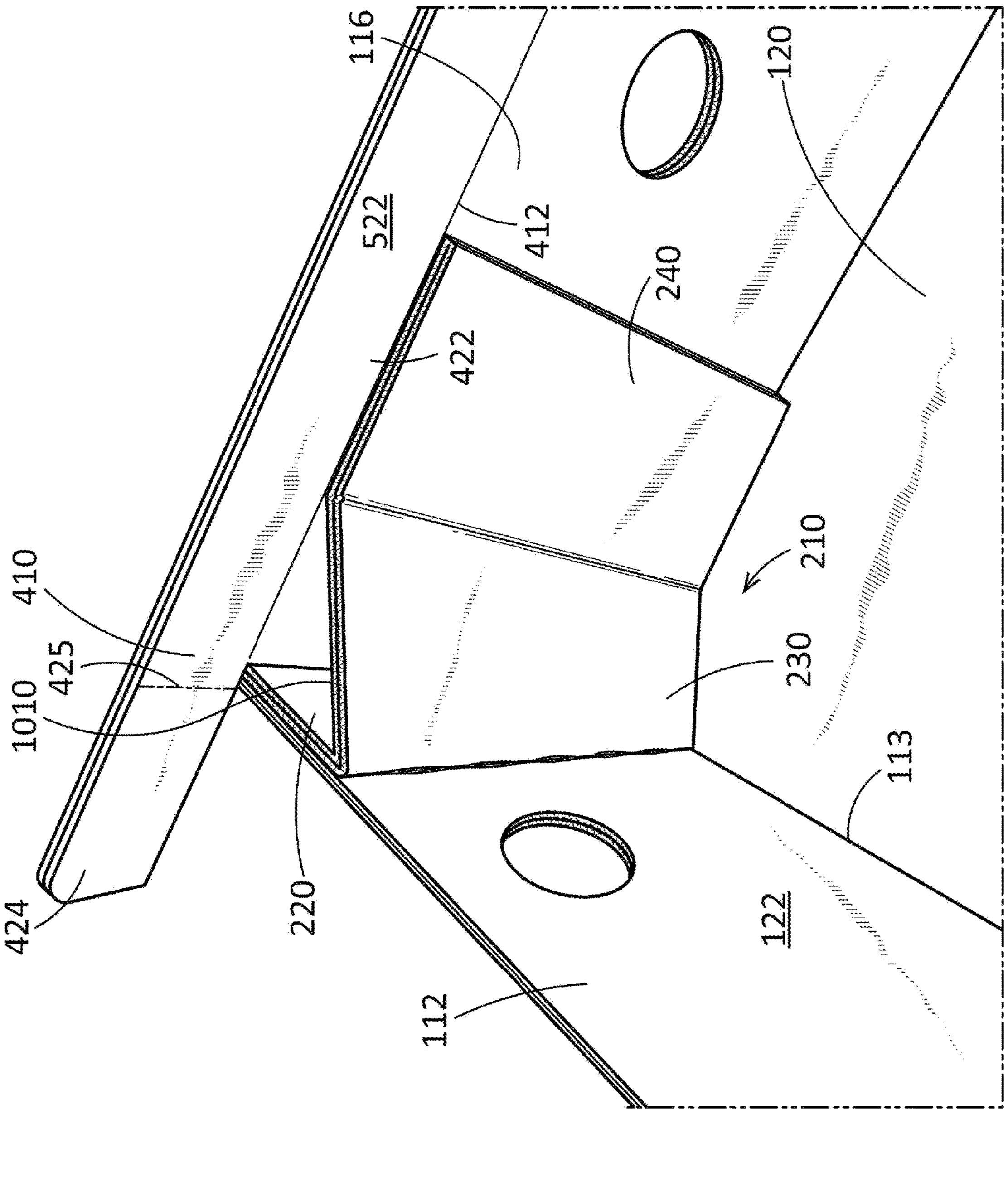
FIG. 7 is a detail perspective view of one step of assembly of the packing element of FIG. 5 formed from the blank of FIG. 1.

With reference to FIG. 7, the side wall 112 can be seen bent with respect to the base 120 along line 113 such that inner surface 122 can be in facing contact with an outer surface (not shown) of first support panel 220. In various aspects, facing contact can be coplanar. In various aspects, inner surface 122 can be adhered to the outer surface of the first support panel 220. In various aspects, inner surface 122 can be adhered to the outer surface of first support panel 220 using glues, tapes, mechanical fasteners, key-fit arrangements defined in the various surfaces, and chemical adhesion among various other forms of connection depending on the material used to form the packaging 1000. In the current aspect, adhesion is not utilized, as will be discussed in additional detail below.

Figure 8:
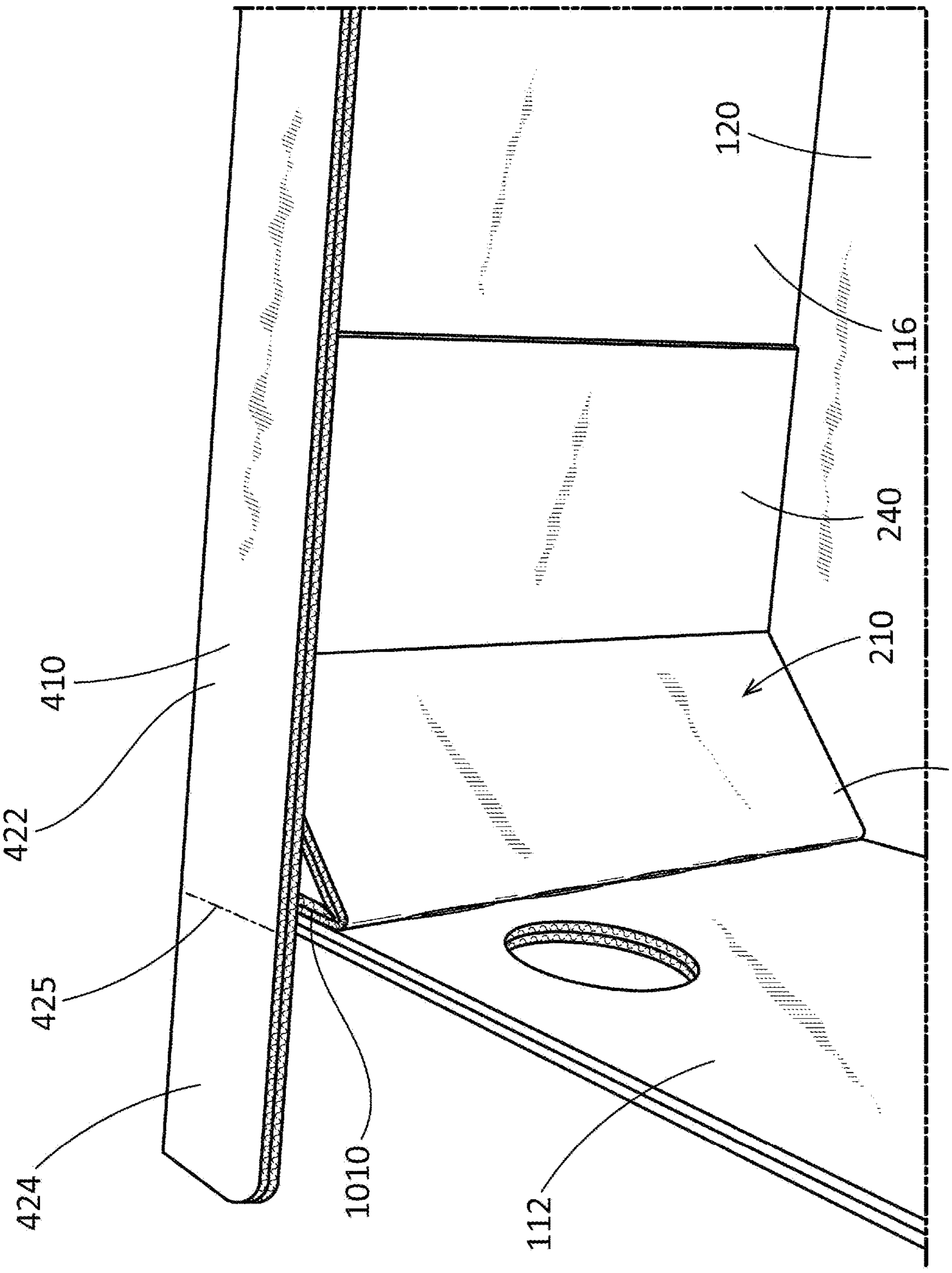
FIG. 8 is a detail perspective view of another step of assembly of the packing element of FIG. 5 formed from the blank of FIG. 1.
Figure 9:
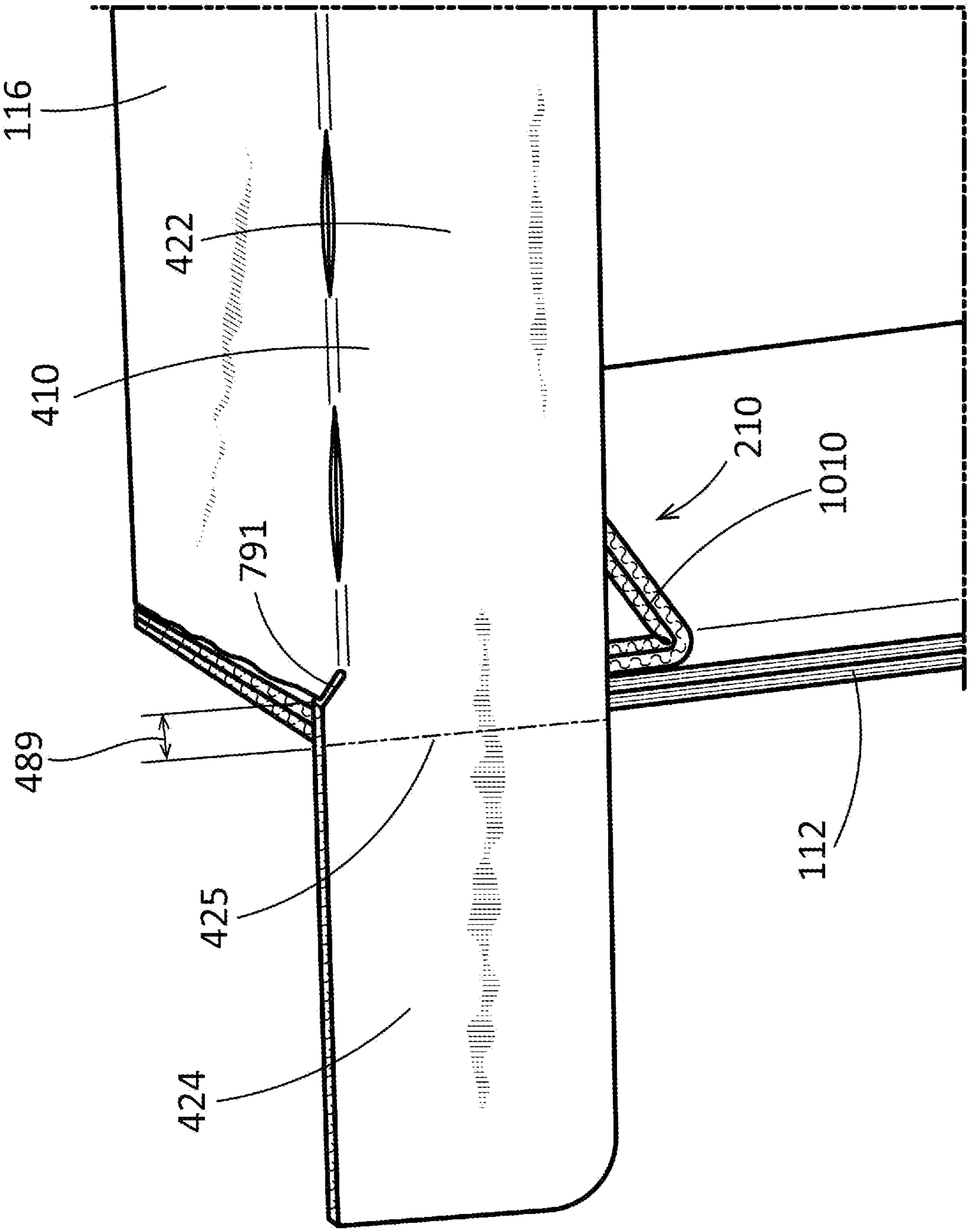
FIG. 9 is a detail perspective view of the assembly step of FIG. 8.

As seen with reference to FIGS. 8-9 and with concurrent reference to FIG. 7, the top tab 410 can be bent with respect to side wall 116 along line 412 such that inner surface 522 of central portion 422 can be arranged in facing arrangement with the support formation 210. The top tab 410 can be arranged such that the inner surface 522 contacts an end 1010 of the support formation. Such an arrangement can provide added support for the top tab 410 because the support formation 210 in its final arrangement can be sufficiently rigid to add additional support. The overhang distance 489 can be seen with reference to the thickness of side wall 112. As can be seen, the overhang distance 489 can be sized to accommodate the side wall 112 and the thickness of the material over which the top tab 410 can be folded.

Figure 10:
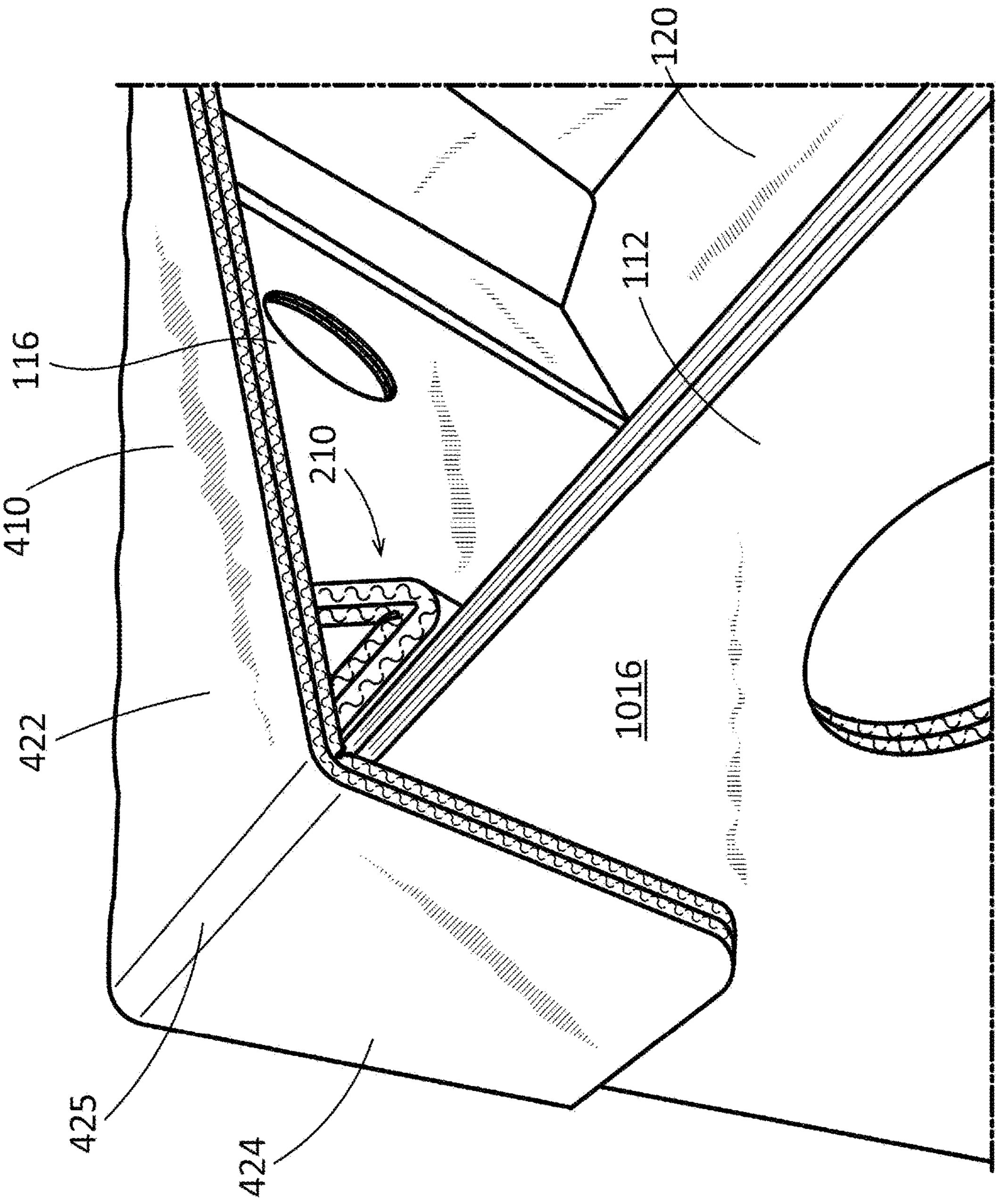
FIG. 10 is a detail perspective view of another step of assembly of the packing element of FIG. 5 formed from the blank of FIG. 1.

As seen with reference to FIG. 10, the side portion 424 can be folded with respect to the central portion 422 along line 425 such that inner surface 524 can be in facing contact with an outer surface 1016 of side wall 112. In various aspects, facing contact can be coplanar. In various aspects, inner surface 524 can be adhered to outer surface 1016 using glues, tapes, mechanical fasteners, key-fit arrangements defined in the various surfaces, and chemical adhesion among various other forms of connection depending on the material used to form the packaging 1000. In the current aspect, inner surface 524 can be adhered to outer surface 1016 using glue.

Figure 11:
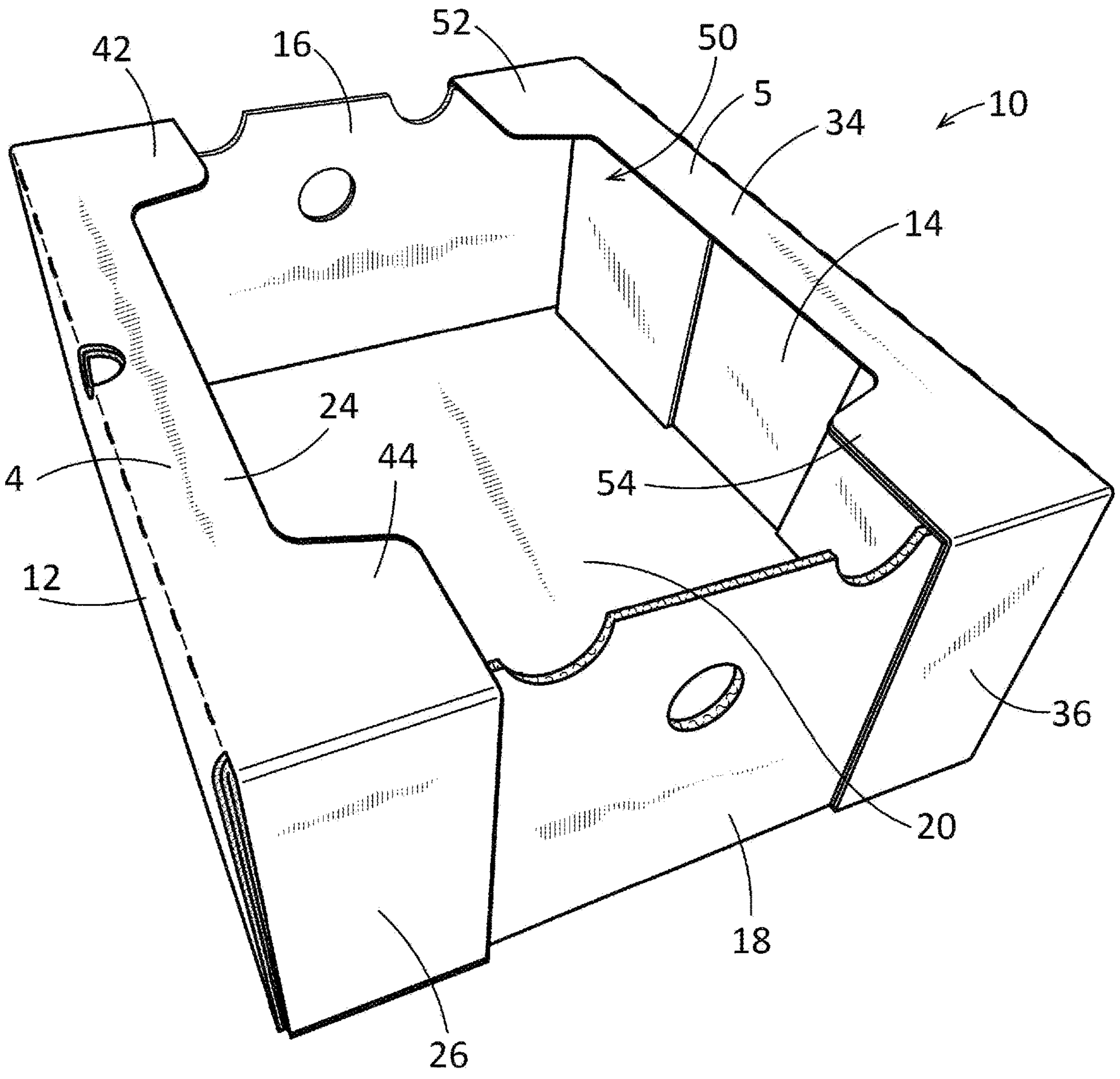
FIG. 11 is a perspective view of a packaging element as would be known and understood to one of skill in the art.

An exhibit of different design of packaging 10 can be seen with reference to FIG. 11. The packaging 10 can include a base 20 and side walls 12, 14, 16, 18. The packaging can include a top tab 4 connected to side wall 12 and a top tab 5 connected to side wall 14. Top tab 4 can include a central portion 24 and at least one side portion 26. The top tab 5 can include a central portion 34 and at least one side portion 36. It should be noted that side portions 26,36 extend along an entirety of side wall 18 and are thick in arrangement, covering about one fourth of the side each 18 for each of side portion 26*s*,36. As can be seen the packaging does not include any feature similar to support formations 210,260, 310,360 of blank 100,100*a*. Top tab 4 can include thickened ends 42,44, and top tab 5 can include thickened ends 52,54. Such ends 42,44,52,54 can be necessary in various applications to provide structure without support formations. An opening 50 can be seen defined between top tab 4 and top tab 5.

Comparing FIG. 5 to FIG. 11, advantages of the blank 100 and packaging 1000 over packaging 10 can be seen. Packaging 1000 can define an larger opening 1050 than packaging 10 can define with opening 50. Filling and emptying the packaging 1000 can be easier and more efficient because of the enlarged opening 1050 as opposed to opening 50. Further, packaging 1000 can be much sturdier than packaging 10 because the support formations 210,260,310,360 can be arranged to support top tabs 410,460. Packaging 10 can not reinforce top tabs 4,5 with supports and, as such, rely merely on thickened ends 42,44,52,54 to maintain any structure. Finally, packaging 1000 uses less material than packaging 10 because side portions 424,426,474,476 can be made much smaller than side portions 26,36 because of the structural support made possible by the support formations 210,260,310,360.

Figure 12:
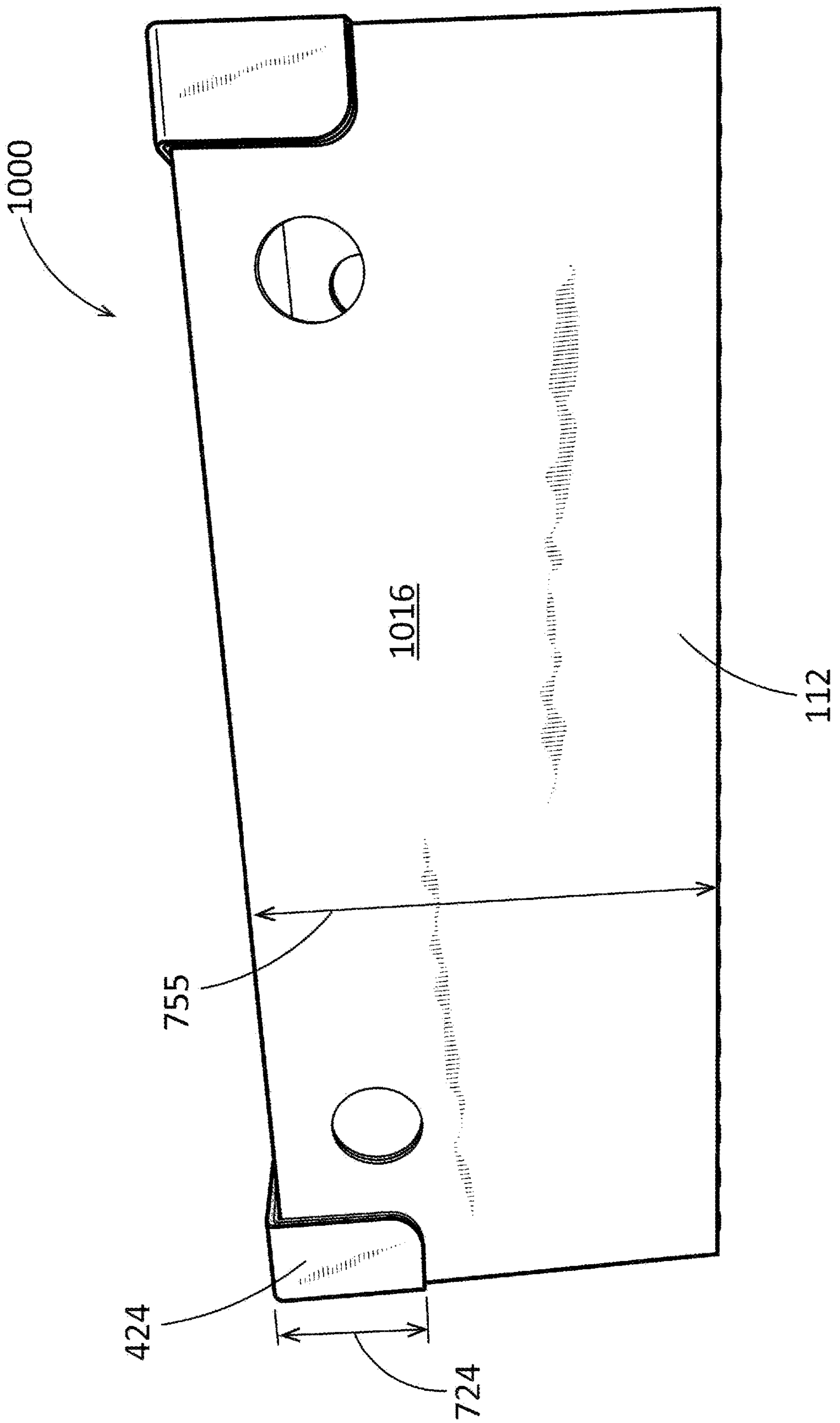
FIG. 12 is a side perspective view of the packaging element of FIG. 5

With reference to FIG. 12, the packaging 1000 can include a height dimensions that is about the same as the composite distance 755. The width 724 of the side portion 424 can be seen with reference to the composite distance

755. As previously mentioned, the width 724 can be of various arrangements in various aspects. In the current aspect, the width 724 can be less than 35% of the composite distance. As such, the width 724 in the current aspect can extend over a smaller portion of the surface 1016 of side wall 112 than seen with reference to side portions 26,36 of packaging 10. As such, packaging 1000 can be made of less material than packaging 10 while providing multiple structural advantages.

Figure 13:
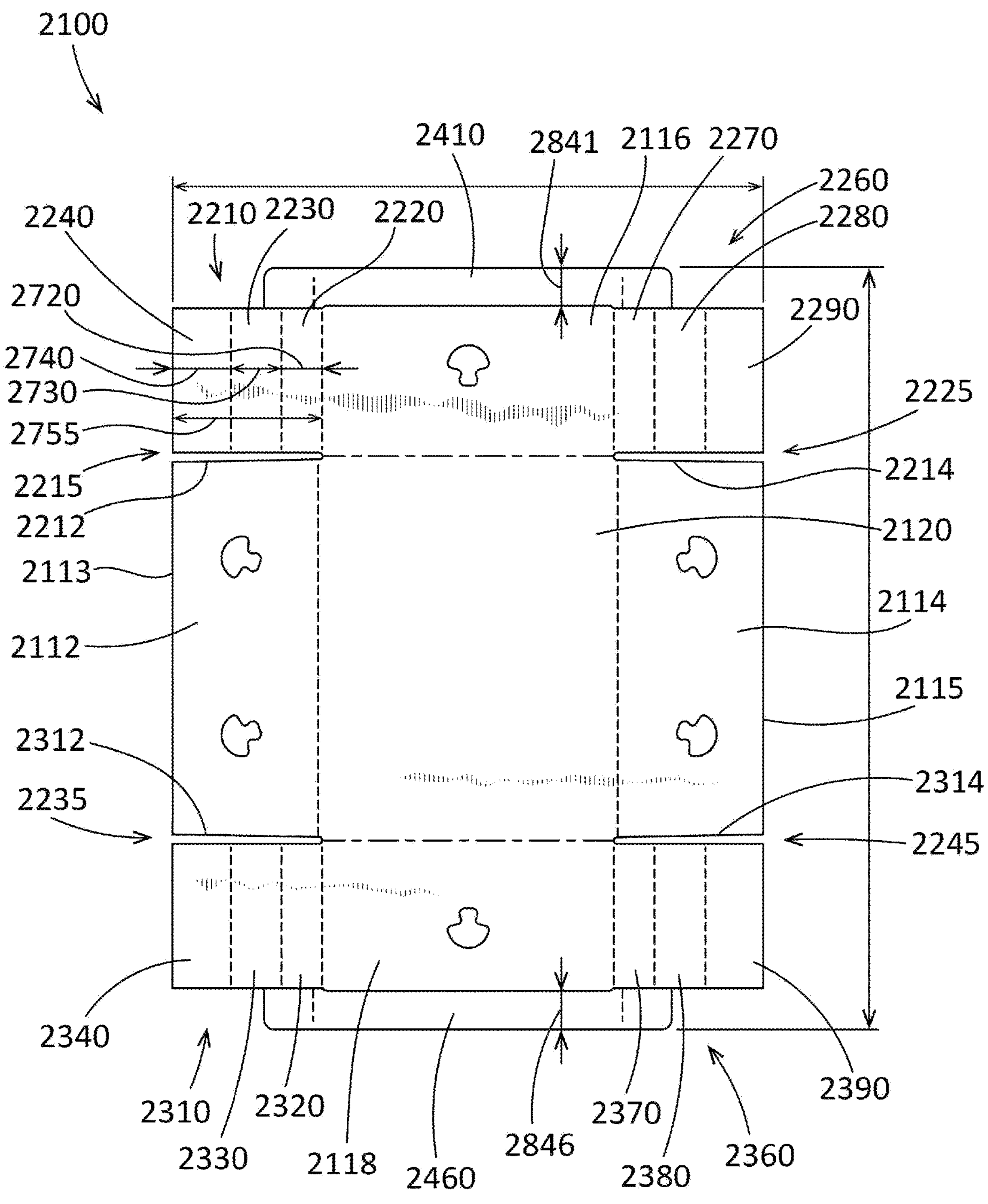
FIG. 13 is a plan view of another blank for producing a packaging element in accordance with one aspect of the current disclosure.

With reference to FIG. 13, another aspect of a blank 2100 can be seen. Blank 2100 can be substantially similar to blank 100 with some modifications. The blank 2100 can comprise a plurality of side walls 2112, 2114, 2116, 2118 connected to a base 2120. Connections can be by lines similar to those previously described. A top tab 2410 can be connected to side wall 2116. A top tab 2460 can be connected to side wall 2118.

Side wall 2116 can be connected to a support formation 2210. Side wall 2116 can be connected to a support formation 2260. In the current aspect, support formation 2210 can comprise a first support panel 2220, a second support panel 2230, and a connection support panel 2240. In the current aspect, support formation 2260 can comprise a first support panel 2270, a second support panel 2280, and a connection support panel 2290. Each first support panel 2220,2270 can be connected to the side wall 2116. Second support panels 2230,2280 can be connected to first support panels 2220, 2270, respectively. Connection support panels 2240,2290 can be connected to second support panels 2230,2280, respectively. A gap cut 2215 defined between side wall 2112 and support formation 2210 can be defined by an edge 2212 of the side wall 2112. The edge 2212 can be angled with respect to the support formation 2210 such that the gap cut 2215 can be wider proximate an end 2113 of the side wall 2112. A gap cut 2225 defined between side wall 2114 and support formation 2260 can be defined by an edge 2214 of the side wall 2114. The edge 2214 can be angled with respect to the support formation 2260 such that the gap cut 2225 can be wider proximate an end 2115 of the side wall 2114.

Side wall 2118 can be connected to a support formation 2310. Side wall 2118 can be connected to a support formation 2360. In the current aspect, support formation 2310 can comprise a first support panel 2320, a second support panel 2330, and a connection support panel 2340. In the current aspect, support formation 2360 can comprise a first support panel 2370, a second support panel 2380, and a connection support panel 2390. Each first support panel 2320,2370 can be connected to the side wall 2118. Second support panels 2330,2380 can be connected to first support panels 2320, 2370, respectively. Connection support panels 2340,2390 can be connected to second support panels 2330,2380, respectively. A gap cut 2235 defined between side wall 2112 and support formation 2310 can be defined by an edge 2312 of the side wall 2112. The edge 2312 can be angled with respect to the support formation 2310 such that the gap cut 2235 can be wider proximate the end 2113 of the side wall 2112. A gap cut 2245 defined between side wall 2114 and support formation 2360 can be defined by an edge 2314 of the side wall 2114. The edge 2314 can be angled with respect to the support formation 2360 such that the gap cut 2245 can be wider proximate the end 2115 of the side wall 2114.

As dimensions of various side walls 2112,2114,2116,2118 can be different from in other aspects of the current disclosure, various features may need slight resizing as compared to other aspects. For example, top tabs 2410,2460 can be of heights 2841,2846, respectively. The heights 2841,2846 of top tabs 2410,2460 for blank 2100 can be different from the heights 841,846 of top tabs 410,460, respectively. In the current aspect, the heights 2841,2846 can be about 1.5625 inches. Similarly, the support formations 2210,2260,2310, 2360 can be of variant dimensions as well. As represented in principal by support formation 2210, the connection support panel 2240 can be of a width 2740 of about 2.3125 inches; the second support panel 2230 can be of a width 2730 of about 2 inches; and, the first support panel 2220 can be of a width 2720 of about 1.5625 inches. A composite distance 2755 can be a sum of the widths 2720,2730,2740. Other support formations 2210,2260,2310,2360 of the current aspect can be of similar dimensions in various configurations. Other dimensions of blank 2100 can be of substantially similar configuration to blank 100.

Figure 14:
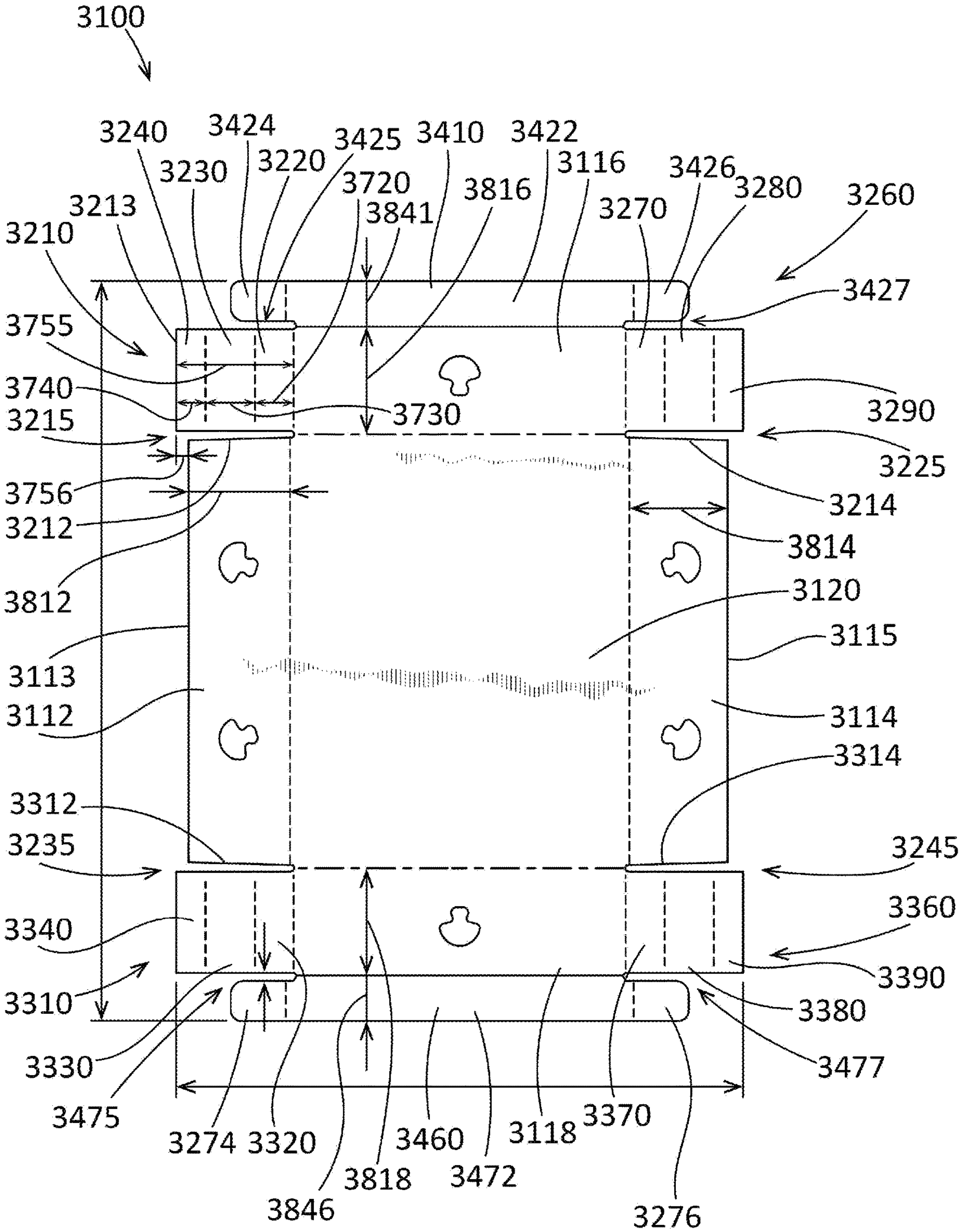
FIG. 14 is a plan view of another blank for producing a packaging element in accordance with one aspect of the current disclosure.

With reference to FIG. 14, another aspect of a blank 3100 can be seen. Blank 3100 can be similar to blanks 100,2100 with some modifications. The blank 3100 can comprise a plurality of side walls 3112, 3114, 3116, 3118 connected to a base 3120. Connections can be by lines similar to those previously described. A top tab 3410 can be connected to side wall 3116. A top tab 3460 can be connected to side wall 3118.

Side wall 3116 can be connected to a support formation 3210. Side wall 3116 can be connected to a support formation 3260. In the current aspect, support formation 3210 can comprise a first support panel 3220, a second support panel 3230, and a connection support panel 3240. In the current aspect, support formation 3260 can comprise a first support panel 3270, a second support panel 3280, and a connection support panel 3290. Each first support panel 3220,3270 can be connected to the side wall 3116. Second support panels 3230,3280 can be connected to first support panels 3220, 3270, respectively. Connection support panels 3240,3290 can be connected to second support panels 3230,3280, respectively. A gap cut 3215 defined between side wall 3112 and support formation 3210 can be defined by an edge 3212 of the side wall 3112. The edge 3212 can be angled with respect to the support formation 3210 such that the gap cut 3215 can be wider proximate an end 3113 of the side wall 3112. A gap cut 3225 defined between side wall 3114 and support formation 3260 can be defined by an edge 3214 of the side wall 3114. The edge 3214 can be angled with respect to the support formation 3260 such that the gap cut 3225 can be wider proximate an end 3115 of the side wall 3114.

Side wall 3118 can be connected to a support formation 3310. Side wall 3118 can be connected to a support formation 3360. In the current aspect, support formation 3310 can comprise a first support panel 3320, a second support panel 3330, and a connection support panel 3340. In the current aspect, support formation 3360 can comprise a first support panel 3370, a second support panel 3380, and a connection support panel 3390. Each first support panel 3320,3370 can be connected to the side wall 3118. Second support panels 3330,3380 can be connected to first support panels 3320, 3370, respectively. Connection support panels 3340,3390 can be connected to second support panels 3330,3380, respectively. A gap cut 3235 defined between side wall 3112 and support formation 3310 can be defined by an edge 3312 of the side wall 3112. The edge 3312 can be angled with respect to the support formation 3310 such that the gap cut 3235 can be wider proximate the end 3113 of the side wall 3112. A gap cut 3245 defined between side wall 3114 and support formation 3360 can be defined by an edge 3314 of the side wall 3114. The edge 3314 can be angled with respect to the support formation 3360 such that the gap cut 3245 can be wider proximate the end 3115 of the side wall 3114.

Blank 3100 can be somewhat different in arrangement from blanks 2100,100. In various aspects, the base 3120 can be of about the same size as base 2120,120. A width 3812 of the side wall 3112 can be of about 3.5625 inches. A width 3814 of the side wall 3114 can be about the same as the width 3812. A height 3816 of side wall 3116 can be about the same as a height 3818 of side wall 3118. Each height 3816,3818 can be about 3.6875 inches. In various aspects, various measurements can be utilized.

Dimensions of the support formation 3210 can be the representative of dimensions of each support formation 3260,3310,3360 in various aspects. A width 3720 of the first support panel 3220 can be about 1.375 inches. A width 3730 of the second support panel 3230 can be about 1.75 inches. A width 3740 of the connection support panel 3240 can be about 1 inch. As such, a composite distance 3755 of the support formation 3210 can be about 4.125 inches. As such, an overhang 3756 of about 0.4375 inches exists between the edge 3113 and an end 3213 of the support formation 3210.

Each top tab 3410,3610 can be of a different arrangement than top tabs 2410,2610,410,610. Side portions 3424,3426 can be arranged connected to central portion 3422 of top tab 3410. Side portions 3274,3276 can be arranged connected to central portion 3472 of top tab 3460. Gap cuts 3425,3427 can be defined between and be arranged to separate each side portion 3424,3426 from one support formation 3210,3260, respectively. Gap cuts 3475,3477 can be defined between and be arranged to separate each side portion 3274,3276 from one support formation 3310,3360, respectively. A height 3841 of the top tab 3410 can be about 1.5625 inches. A height 3846 of the top tab 3460 can be about the same as the height 3841. In various aspects, the side portions 3424, 3426,3274,3276 can be filleted for ease of manufacture and for ease of assembly.

In various aspects, features, dimensions, and modifications from one blank 3100,2100,100 can be interchangeable with features, dimensions, and modifications from another blank 3100,2100,100. One of skill in the art would understand that the disclosed aspects are but a sample of methods and apparatus from which an article could be made in accord with the disclosure herein. No particular feature or set of features should be considered limiting on the scope of the disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A blank for forming packaging, the blank comprising:
- a base;
- a plurality of side walls connected to the base, each side wall connected to the base by a line;
- at least one support formation connected to one side wall by a line, each support formation comprising
  - a first support panel connecting to the side wall by a line;
  - a second support panel connected to the first support panel by a line; and,
  - a connection support panel connected to the second support panel by a line; and at least one top tab connected to one side wall by a line, each top tab comprising
  - a central portion defining a height; and,
  - at least one side portion defining a height and a width, each side portion connected to the central portion by a line;
- wherein each side portion defines a horizontal edge, a vertical edge, and a joining edge, the joining edge defining a fillet and joining the horizontal edge to the vertical edge; and
- wherein the height of the side portion is greater than the height of the central portion.

2. The blank of claim 1, wherein top tab and the support formation are connected to the same side wall.

3. The blank of claim 1, wherein each side wall defines a height, and wherein the width of the side portion is less than 35% of the height of the side wall.

4. The blank of claim 3, wherein the width of the side portion is 34.7% of the height of the side wall.

5. The blank of claim 4, wherein the blank is formed of corrugated cardboard.

6. The blank of claim 1, wherein each side wall defines a height, and wherein the width of the side portion is less than 35% of the height of the side wall.

7. The blank of claim 6, wherein the width of the side portion is 34.7% of the height of the side wall.

8. The blank of claim 1, wherein the blank is formed of corrugated cardboard.

9. The blank of claim 8, wherein the central portion is longer than the base by an overhang distance, the overhang distance being sized to about a thickness of the corrugated cardboard.

10. A packaging element formed from a blank, the packaging element comprising:
- a base;
- a first side wall connected to the base;
- a second side wall opposite the first side wall, the second side wall connected to the base;
- a third side wall adjacent to each of the first side wall and the second side wall, the third side wall connected to the base;

a fourth side wall opposite the first side wall and adjacent to the first side wall and the second side wall, the fourth side wall connected to the base;

a support formation connected to the third side wall, the support formation comprising a first support panel connecting to and arranged orthogonally to the third side wall, the first support panel contacting the first side wall;

a second support panel connected to and arranged at an acute angle to the first support panel; and, a connection support panel connected to the second support panel and arranged coplanar to and contacting the third side wall, the connection support panel adhered to the third side wall, wherein the support formation defines an end; and a top tab connected to one side wall, the one side wall being one of the first side wall, the second side wall, the third side wall, and the fourth side wall, the top tab comprising a central portion defining a height and arranged orthogonally to the one side wall; and, at least one side portion defining a height and a width, each side portion connected to and arranged orthogonally to the central portion;

wherein each side portion is adhered in coplanar facing contact to one other side wall, the one other side wall being one of the first side wall, the second side wall, the third side wall, and the fourth side wall, the one other side wall being different from the one side wall; and wherein the height of the side portion is greater than the height of the central portion.

11. The packaging element of claim 10, wherein each side portion defines a horizontal edge, a vertical edge, and a joining edge, the joining edge defined joining the horizontal edge to the vertical edge.

12. The packaging element of claim 11, wherein the joining edge is a fillet.

13. The packaging element of claim 10, wherein each of the first side wall, second side wall, third side wall, and fourth side wall defines a height, the height also being the height of the packaging, and wherein the width of each side portion is less than 35% of the height of the packaging.

14. The packaging element of claim 13, wherein the width of each side portion is about 34.7% of the height of the packaging.

15. The packaging element of claim 10, wherein each of the first side wall, second side wall, third side wall, and fourth side wall defines a height, the height also being the height of the packaging, and wherein the width of each side portion is about one third the height of the packaging.

16. The packaging element of claim 10, wherein the packaging element is formed of corrugated cardboard.

17. The packaging element of claim 16, the central portion is longer than the base by an overhang distance, the overhang distance being sized to accommodate the thickness of the corrugated cardboard.

18. The packaging element of claim 10, wherein each side portion is adhered to one other side wall by glue.

19. A blank for forming packaging, the blank comprising:

a base;

a plurality of side walls connected to the base, each side wall connected to the base by a line;

at least one support formation connected to one side wall by a line, each support formation comprising a first support panel connecting to the side wall by a line;

a second support panel connected to the first support panel by a line; and, a connection support panel connected to the second support panel by a line; and at least one top tab connected to one side wall by a line, each top tab comprising a central portion defining a height; and, at least one side portion defining a height and a width, each side portion connected to the central portion by a line;

wherein:

the height of the side portion is greater than the height of the central portion;

each side portion defines a horizontal edge, a vertical edge, and a joining edge, the joining edge defined joining the horizontal edge to the vertical edge; and the top tab and the support formation are connected to the same side wall.

* * * * *